(12) United States Patent
Hoffmann et al.

(10) Patent No.: US 11,530,852 B2
(45) Date of Patent: Dec. 20, 2022

(54) COOLING DEVICE

(71) Applicant: B Medical Systems S.a.r.l., Hosingen (LU)

(72) Inventors: Andreas Hoffmann, Ammeldingen (DE); Manuel Godert, St. Vith (BE)

(73) Assignee: B. Medical Systems S.a.r.l., Hosingen (LU)

( * ) Notice: Subject to any disclaimer, the term of this patent is extended or adjusted under 35 U.S.C. 154(b) by 0 days.

(21) Appl. No.: 15/604,274

(22) PCT Filed: Nov. 25, 2014

(86) PCT No.: PCT/EP2014/075520
§ 371 (c)(1),
(2) Date: May 24, 2017

(87) PCT Pub. No.: WO2016/082862
PCT Pub. Date: Jun. 2, 2016

(65) Prior Publication Data
US 2019/0145673 A1    May 16, 2019

(51) Int. Cl.
*F25B 27/00*      (2006.01)
*H02J 3/38*      (2006.01)
(Continued)

(52) U.S. Cl.
CPC ............ *F25B 27/002* (2013.01); *F25D 29/00* (2013.01); *H02J 3/14* (2013.01); *H02J 3/381* (2013.01);
(Continued)

(58) Field of Classification Search
CPC ....... F25B 27/002; F25B 2500/06; H02J 7/35; H02J 3/383; H02J 3/14; H02J 3/381;
(Continued)

(56) References Cited

U.S. PATENT DOCUMENTS 2,969,637 A * 1/1961 Rowekamp ............. F24S 60/30
60/641.8
3,850,006 A * 11/1974 Redfern ................. B60H 1/005
62/216
(Continued)

FOREIGN PATENT DOCUMENTS

BE       1018559       3/2011
CN    201593896 U     9/2010
(Continued)

OTHER PUBLICATIONS

English Language Machine Translation of EP 2 169 331.

*Primary Examiner* — Eric S Ruppert
*Assistant Examiner* — Kirstin U Oswald
(74) *Attorney, Agent, or Firm* — Jerold I. Schneider; Schneider IP Law

(57) ABSTRACT

Cooling device 1, in particular a freezer 2, having a closable cooling space 3, an electrically operated cooling circuit, and preferably a cold storage pack 4, wherein the at least one closable cooling space 3 and the cold storage pack 4 can be cooled by the electrically operated cooling circuit. The cooling device has a power distributor 5 for distributing electrical power of at least one regenerative power source 6 to an electrically operated cooling circuit of the cooling device 1 and to at least one further electricity consuming device 7. In addition, the power distributor 5 has a control system with a computing unit 23, a memory 24 and priority logic. The priority logic is used to preferentially supply the electrically operated cooling circuit of the cooling device 1 with electricity if there is a lack of electrical power of the at least one regenerative power source 6.

19 Claims, 9 Drawing Sheets

Figure 1:
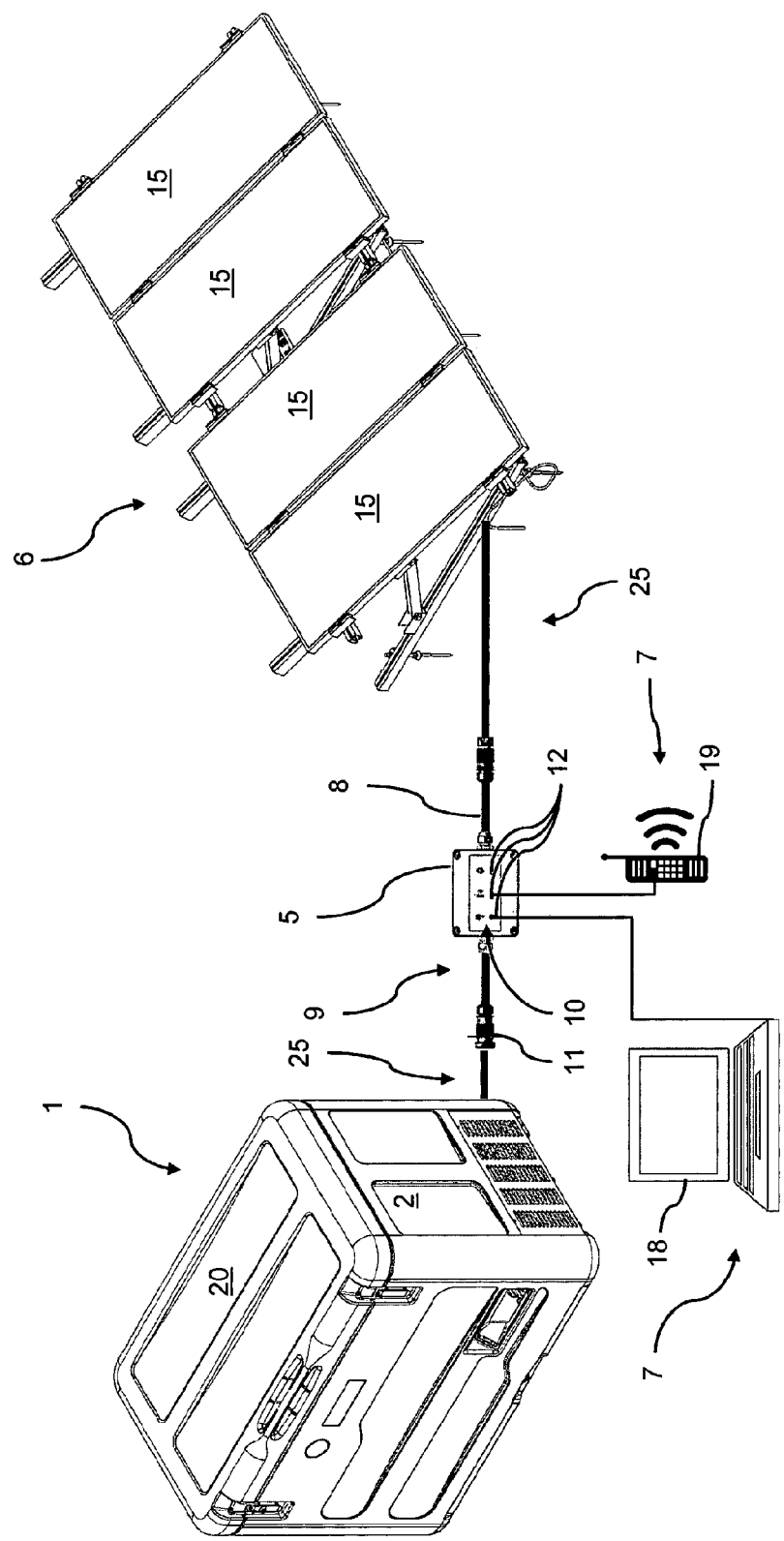

(51) Int. Cl.
| | |
|---|---|
| *H02J 7/35* | (2006.01) |
| *H02J 3/14* | (2006.01) |
| *F25D 29/00* | (2006.01) |
| *H02J 3/46* | (2006.01) |

(52) U.S. Cl.
CPC ................................ *H02J 3/46* (2013.01);
*H02J 7/35* (2013.01); *F25B 2500/06*
(2013.01); *F25D 29/006* (2013.01); *F25D 2400/12* (2013.01); *H02J 2300/24* (2020.01);
*Y02A 40/966* (2018.01); *Y02B 30/70*
(2013.01); *Y02B 70/30* (2013.01); *Y02B 70/3225* (2013.01); *Y02E 10/56* (2013.01);
*Y04S 20/222* (2013.01); *Y04S 20/244*
(2013.01)

(58) Field of Classification Search
CPC ...... H02J 3/46; H02J 2300/24; H02J 2310/12;
H02J 2310/14; F25D 29/00; F25D 29/006; F25D 2400/12; Y02A 40/966;
Y04S 20/222; Y04S 20/244; Y04S 20/242; Y02E 10/566; Y02E 10/563;
Y02E 10/56; Y02B 30/765; Y02B 70/3275; Y02B 70/3225; Y02B 30/70;
Y02B 70/30
USPC .......................................... 62/235
See application file for complete search history.

(56) References Cited

U.S. PATENT DOCUMENTS

| | | | | | |
|---|---|---|---|---|---|
| 3,959,982 | A * | 6/1976 | Denis | ............. | F25B 19/00 62/223 |
| 4,027,727 | A * | 6/1977 | Pullens | ............. | F25D 23/12 165/48.1 |
| 4,281,515 | A * | 8/1981 | Ferriera | ............. | F25B 15/06 62/235.1 |
| 4,367,633 | A * | 1/1983 | Strathman | ............. | F25B 49/02 62/235.1 |
| 4,728,901 | A * | 3/1988 | Pepper | ............. | H03F 3/505 323/280 |
| 4,846,257 | A * | 7/1989 | Wallace | ............. | F25D 31/005 62/223 |
| 4,981,019 | A * | 1/1991 | Hicks | ............. | F25B 27/007 62/3.62 |
| 5,153,561 | A * | 10/1992 | Johnson | ............. | A45C 13/24 190/101 |
| 5,197,291 | A * | 3/1993 | Levinson | ............. | G01R 21/00 136/291 |
| 5,379,596 | A * | 1/1995 | Grayson | ............. | H02S 20/30 136/246 |
| 5,575,703 | A * | 11/1996 | Stearns | ............. | A01K 47/06 449/13 |
| 5,873,258 | A * | 2/1999 | Pfister | ............. | F25B 17/08 257/E23.088 |
| 6,021,642 | A * | 2/2000 | Guinn | ............. | A45C 5/005 62/235.1 |
| 6,082,122 | A * | 7/2000 | Madenokouji | ....... | G01D 18/008 62/77 |
| 6,240,737 | B1 * | 6/2001 | Albiez | ............. | F25B 27/002 62/228.5 |
| 6,305,185 | B1 * | 10/2001 | Sloan | ............. | A45C 15/00 62/235.1 |
| 6,308,518 | B1 * | 10/2001 | Hunter | ............. | F25B 21/02 62/3.3 |
| 6,751,963 | B2 * | 6/2004 | Navedo | ............. | F25B 9/14 62/457.9 |
| 6,813,897 | B1 * | 11/2004 | Bash | ............. | F25B 27/00 307/64 |
| 7,196,433 | B2 | 3/2007 | Yang | | |
| 7,481,070 | B2 * | 1/2009 | Costanzo | ............. | F25B 27/005 62/235.1 |
| 7,884,502 | B2 * | 2/2011 | Lyman | ............. | H02S 10/10 307/64 |
| 8,539,790 | B1 * | 9/2013 | Budd | ............. | A01N 1/0252 62/457.9 |
| 8,549,871 | B1 * | 10/2013 | Lauchnor | ............. | F25D 3/06 62/371 |
| 8,567,211 | B2 * | 10/2013 | Al-Rasheed | ............. | F25D 3/08 62/331 |
| 8,631,908 | B2 * | 1/2014 | Schroeder-Brumloop | ............. | B66B 1/30 187/290 |
| 8,869,546 | B2 | 10/2014 | Besore | | |
| 9,455,572 | B2 | 9/2016 | Motsenbocker | | |
| 9,711,967 | B1 * | 7/2017 | Czarnecki | ............. | H02J 5/00 |
| 2006/0158037 | A1 * | 7/2006 | Danley | ............. | H02J 3/32 307/64 |
| 2007/0199336 | A1 * | 8/2007 | Tantot | ............. | F24F 11/30 62/157 |
| 2009/0139248 | A1 * | 6/2009 | Crumlin | ............. | A45F 3/047 62/62 |
| 2009/0158770 | A1 | 6/2009 | Cohrs | | |
| 2009/0277187 | A1 * | 11/2009 | McGann | ............. | F25B 21/02 62/3.6 |
| 2010/0070091 | A1 * | 3/2010 | Watson | ............. | H02J 3/14 700/278 |
| 2010/0213887 | A1 * | 8/2010 | Louch | ............. | H02J 7/00 320/101 |
| 2010/0264875 | A1 * | 10/2010 | Hoffman | ............. | H02J 7/02 320/111 |
| 2011/0031171 | A1 * | 2/2011 | Henig | ............. | C02F 1/32 210/252 |
| 2013/0180267 | A1 * | 7/2013 | Hartig | ............. | F25C 1/00 62/62 |
| 2013/0307698 | A1 * | 11/2013 | Park | ............. | G08C 17/02 340/815.4 |
| 2014/0174115 | A1 * | 6/2014 | Lauchnor | ............. | F25D 31/007 62/185 |
| 2014/0265573 | A1 * | 9/2014 | Kreutzman | ............. | F24H 1/0027 307/31 |
| 2015/0027157 | A1 * | 1/2015 | Chou | ............. | F25D 17/042 62/271 |
| 2016/0233787 | A1 * | 8/2016 | Matsuoka | ............. | H02J 3/1842 |
| 2016/0243000 | A1 * | 8/2016 | Gray | ............. | F25B 21/02 |

FOREIGN PATENT DOCUMENTS

| | | |
|---|---|---|
| EP | 2 169 331 | 3/2010 |
| EP | 2221944 | 8/2010 |
| JP | 3157260 U | 1/2010 |
| TW | 1363955 | 5/2012 |

* cited by examiner

COOLING DEVICE

The present invention relates to a cooling device, in particular a cooling device in the form of a freezer, having a closable cooling space, an electrically operated cooling circuit, and preferably a cold storage pack, wherein the at least one closable cooling space and the cold storage pack can be cooled by the electrically operated cooling circuit. Further, the invention relates to a first and a second method to operate a cooling device according to the present invention.

Such cooling devices, in particular freezers, are employed for example in remote areas, in particular in developing countries, where a stable, safe and continuous energy supply, for example via a power grid, cannot be guaranteed. Nevertheless, especially in these areas, where extreme climatic conditions often prevail, an uninterrupted cold chain for storing sensitive refrigerated goods is essential. Foodstuffs and in particular medical products, such as for example vaccines, stored blood, or any other type of blood products may be considered to be sensitive refrigerated goods. In particular, storing the aforementioned products according to the manufacturer's requirements to maintain usability and effectiveness of the products is often difficult, which is considered to be one of the causes of extremely poor living conditions of people living in such areas and significantly contributes to the high mortality rate.

In known cooling devices, the closable cooling space and an optional cold storage pack are cooled by the electric cooling circuit provided that electricity is available. In the event of a failure of the energy or electricity supply, the closable cooling space and thus any refrigerated goods present in the cooling space, such as for example food stuff or medical products, are protected by the cooling device against excessive heating due to the insulated construction of the known cooling devices.

Moreover, there is the need, especially in the above-mentioned regions where a stable, safe and continuous energy supply cannot be guaranteed, to operate other electrical devices, for example electrically operated lamps, cellphones, computers, medical devices, or the like so long as an energy supply is available. As is known, the frequently occurring simultaneous operation of a plurality of electricity consuming devices causes the demand for electrical power to rise sharply and thus exceed the capacity of the existing energy supply, so that the supply of the existing cooling device with electrical power is no longer ensured.

In order to avoid this, it is known to use temporary storage of electricity by means of batteries, wherein the batteries are continuously charged during the period in which energy is available. Due to their capacity to store electrical energy the batteries buffer peak loads that arise when a plurality of electricity consuming devices are switched on such that the battery is discharged as long as the demand for electrical power is higher than that which can be made available via the energy supply.

These systems have proven to be extremely practicable in long-term field tests. However, for the safe operation of a cooling device, the additional batteries have to be carried along. Disadvantages arise here, on the one hand, from the high weight of the batteries during transport of the cooling device to its place of use. Moreover, it has proven to be a problem that batteries for ensuring the energy supply of the cooling device only have a limited service life. Their renewal and disposal causes high costs and a considerable effort. Furthermore, improper disposal of batteries leads to health and environment dangers.

It is therefore an aim of the present invention to provide a cooling device that ensures the desired cooling function and also allows the operation of additional electricity consuming devices, wherein a safe and reliable operation of the cooling device, in particular under adverse conditions, without any impairments is made possible, that is to say, that the cooling space and the refrigerated goods present in the cooling space are reliably stored in the desired temperature range and at the same time the supply of electricity to at least one further electricity consuming device is made possible.

This aim is achieved with a cooling device according to claim 1 as well as a method for operating a cooling device according to claim 10, claim 11, or claim 12. Advantageous further embodiments of the cooling device and the methods for operating the same are described in the dependent claims.

The cooling device according to the invention is distinguished from the cooling devices known from the prior art in that the cooling device has a power distributor for distributing electrical power from at least one regenerative power source to an electrically operated cooling circuit of the cooling device and to at least one further electricity consuming device, and that the power distributor has at least one power input, a first power output and at least one second power output, wherein the at least one power input can be connected to the at least one regenerative power source and the first power output is provided as a cooling device connection for connecting the electrically operated cooling circuit of the cooling device and wherein the at least one second power output is provided as an electricity consuming device connection for connecting the at least one further electricity consuming device. In addition, the power distributor has a control system with a memory, a computing unit and priority logic, wherein in the event of a lack of electrical power from the at least one regenerative power source, the priority logic preferentially supplies the electrically operated cooling circuit of the cooling device with power.

In the cooling device according to the invention, an additional battery for buffering peak loads can be dispensed with, without reducing the security of supply of sufficient electrical power to the cooling device. According to the invention this is achieved by the preferential supply of electricity to the electrically operated cooling circuit of the cooling device. This can be done independently by controlling the power distributor based on its priority logic and without manual intervention by the operating personnel on the power distributor. The cooling device according to the invention also ensures that the electrical power generated by the at least one regenerative power source is used effectively since the preferential supply to the cooling device only operates when there is a lack of electrical power of the at least one regenerative power source.

The connection between the at least one regenerative power source, the power distributor, the electrically operated cooling circuit, and the at least one further electricity consuming device is preferably via an electrical conducting cable connection. The connection between the at least one further electricity consuming device and the power distributor can also be made wirelessly. If the power distributor is arranged separately from the housing of the cooling device, arranging the cooling device connection as a plug connection is expedient, as is also the case for the electricity consuming device connection and the power input at the power distributor. In this way, the at least one further electricity consuming device and the at least one regenerative power source can be easily connected to the power distributor. Furthermore, the power distributor of the cooling device can easily be replaced. If, on the other hand, the power distributor is arranged integrated in the housing of the cooling device, arranging the cooling device connection as a plug connection may be dispensed with.

In a preferred embodiment of the cooling device, the at least one regenerative power source is a solar collector or a wind-driven generator. Arranging the regenerative generator as a solar collector or as a wind-driven generator has the advantage that the cooling device and its electrically operated cooling circuit can be operated independently from the availability of a local power network. Also, solar devices and wind-driven generators can relatively easy be transported to and installed in remote areas. In addition, since the preferred places of use of the cooling device, in particular in developing countries, often have regular and long-term solar radiation or there is sufficient wind, solar collectors or wind-driven generators are particularly suitable for use as regenerative power sources.

In an advantageous embodiment of the cooling device the power distributor has at least one first sensor for determining the power consumption of the electrically operated cooling circuit of the cooling device. This makes it particularly effective to determine whether the cooling circuit of the cooling device is supplied with sufficient electricity or whether there are fluctuations in the power supply of the cooling device. The first sensor can determine the power consumption of the electrically operated cooling circuit of the cooling device directly or indirectly. In indirect determination of the power consumption the sensor measures further electrical parameters, for example the supply voltage applied to the cooling device and/or the current flow. If an insufficient supply for the electrically operated cooling circuit of the cooling device is detected, the control system of the power distributor with the priority logic preferentially supplies the electrically operated cooling circuit with electricity over other electricity consuming devices. As used herein, the power consumption of the electrically operated cooling circuit of the cooling device should be understood as the power consumption of the entire cooling device, i.e. the power the cooling device consumes to maintain the cooling function.

In one embodiment of the cooling device, the power distributor has at least one second sensor for determining the density of available energy. This allows a prediction of how much electrical power the at least one regenerative power source supplies and whether this is sufficient to supply the at least one further electricity consuming device with sufficient power in addition to the electrically operated cooling circuit of the cooling device. The density of the available energy should be understood to mean the amount of energy acting on the at least one regenerative power source. In the case of a solar collector, for example, this is the intensity of the solar radiation acting on the solar collector. This can be determined, for example, using a photoelectric cell. If a wind-driven generator is used as the at least one regenerative power source, the density of the available energy means the strength of the wind, which can be determined, for example, by an anemometer. The second sensor is preferably arranged such that it is exposed as directly as possible to the energy acting on the at least one regenerative power source in order to achieve exact measured values. For example, it is sensible to connect the second sensor with a wiring to the power distributor and to position the second sensor as close as possible to the at least one regenerative power source.

In an advantageous embodiment of the cooling device the power distributor disconnects the at least one further electricity consuming device from the at least one regenerative power source as soon as the electrical power produced by the at least one regenerative power source falls below the power consumption of the cooling device and the at least one further electricity consuming device. By disconnecting the at least one further electricity consuming device from the at least one regenerative power source, the electrically operated cooling circuit can be supplied preferentially with electricity in a particularly simple manner. In this way, the cooling of the closable cooling space is not adversely affected by other electricity consuming devices, even if the electrical power of the at least one regenerative power source drops. The at least one further electricity consuming device can be disconnected from the at least one regenerative power source by, for example, switching off the at least one second power output.

In a preferred embodiment of the cooling device the power distributor connects the at least one further electricity consuming device to the at least one regenerative power source as soon as the electrical power produced by the at least one regenerative power source exceeds the power consumption of the electrically operated cooling circuit of the cooling device and the at least one further electricity consuming device. This ensures that the electrical power generated by the at least one regenerative power source is not wasted. The at least one electricity consuming device can be connected to the at least one regenerative power source by the control system of the power distributor switching on the at least one second power output.

For the operation of the cooling device, it is advantageous that when a plurality of further electricity consuming devices are operated, disconnection from or connection to the at least one regenerative power source is carried out by the power distributor depending on the power consumption of the respective further electricity consuming device. In this way, an improved use of the excess energy that is not needed for the operation of the electrically operated cooling circuit is achieved. It is also possible that the control system of the power distributor connects or disconnects the plurality of further electricity consuming devices either individually or in groups to the at least one regenerative power source depending on how much electrical energy is available that is not needed by the electrically operated cooling circuit. The plurality of further electricity consuming devices can be divided into groups by the control system of the power distributor, so that the sum of the electrical power needed by the plurality of the further electricity consuming devices corresponds as far as possible to the unused electrical power of the at least one regenerative power source.

In an advantageous embodiment of the cooling device, the power distributor supplies the at least one electricity consuming device with electricity when the electrically operated cooling circuit of the cooling device does not consume any electrical power. This provides the advantage that the at least one regenerative power source required for the supply of the electrically operated cooling circuit can be designed with a lower electrical power and thus be more compact and less expensive. Since the electrically operated cooling circuit of the cooling device operates preferentially, that is to say cools the at least one cooling space when the temperature in the at least one closable cooling space risks exceeding the temperature range desired for the storing of the refrigerated goods, this means that the electrically operated cooling circuit does not require electrical power when the temperature in the at least one closable cooling space corresponds to the desired temperature range. The electrical power of the at least one regenerative power source then in excess can be supplied to the at least one further electricity consuming device for the period in which the electrically operated cooling circuit is not in operation.

In a preferred embodiment of the cooling device, the electricity consuming device connection is designed as a charging device for a battery-operated electricity consuming device, in particular a lamp and/or a mobile phone and/or a computer. However, all other types of electrically operated electricity consuming device are also possible, for example medical devices. By connecting a battery-operated electricity consuming device to an electricity consuming device connection, the excess electrical power of the at least one regenerative power source can be stored in the battery of the battery-operated electricity consuming device. Thus, for example, there is also sufficient light available at night to treat patients in a remote area with medical products stored in a cooling device according to the invention, or to obtain medical advice or help via communication devices, such as the computer or telephone, without having to provide an additional regenerative power source for the supply of the battery-operated electricity consuming device.

A first method according to the invention for operating a cooling device according to the invention comprises the following method steps:

a) a first determination of the power consumption of the electrically operated cooling circuit of the cooling device by the first sensor before connecting the at least one further electricity consuming device to the at least one regenerative power source;

b) storing the first determination in the memory of the control system;

c) connecting the at least one further electricity consuming device to the at least one regenerative power source;

d) a second determination of the power consumption of the electrically operated cooling circuit of the cooling device by the first sensor after the at least one further electricity consuming device has been connected to the at least one regenerative power source;

e) comparison of the first determination with the second determination in the computing unit;

f) disconnecting the at least one further electricity consuming device from the at least one regenerative power source if the power consumption of the second determination is below the power consumption of the first determination;

g) periodic repetition of method steps a) to f).

The method is based on the realization that the power consumption of the electrically operated cooling circuit decreases as soon as the at least one further electricity consuming device is switched on and the electrical power produced by the at least one regenerative power source is insufficient to supply both the electrically operated cooling circuit and the at least one further electricity consuming device with sufficient electricity. This decrease in the power consumption is determined by the first sensor of the power distributor and passed on to the control system of the power distributor. Using the priority logic, the control system then causes the at least one further electricity consuming device to be disconnected from the at least one regenerative power source.

If, on the other hand, sufficient electrical power of the at least one regenerative power source is available for the operation of the electrically operated cooling circuit of the cooling device and the at least one further electricity consuming device, the power consumption of the electrically operated cooling circuit does not decrease in the second determination compared to the first determination. Accordingly, the at least one further electricity consuming device can continue to be operated.

Since processing steps a) to f) are repeated periodically, i.e. regularly, on the one hand, an increase or decrease in the electrical power produced by the at least one regenerative power source is detected by the control system of the power distributor and, accordingly, the at least one further electricity consuming device is connected to or disconnected from the at least one regenerative power source. In addition, the control system of the power distributor also takes in to account a changed power consumption of the electrically operated cooling circuit, for example when it operates to cool the at least one closable cooling space or when the electrically operated cooling circuit is not in operation. This makes it possible to deliver a maximum of excess electrical power to the at least one further electricity consuming device.

The second inventive method for operating a cooling device according to the invention comprises the following method steps:

a) inputting the maximum power consumption of the electrically operated cooling circuit of the cooling device, inputting the performance characteristics of the regenerative power source, and inputting the maximum power consumption of the at least one further electricity consuming device into the memory of the control system;

b) determining the density of the available energy by the second sensor;

c) calculating the available power of the regenerative power source in the computing unit of the control system based on the performance characteristics of the regenerative power source and the density of the available energy;

d) connecting the at least one further electricity consuming device to the at least one regenerative power source if the available power of the regenerative power source is greater than or equal to the sum of the maximum power consumption of the electrically operated cooling circuit of the cooling device and the maximum power consumption of the at least one further electricity consuming device;

e) disconnecting the at least one further electricity consuming device from the at least one regenerative power source if the available power of the regenerative power source is less than the sum of the maximum power consumption of the electrically operated cooling circuit of the cooling device and the maximum power consumption of the at least one further electricity consuming device;

f) periodic repetition of method steps b) to e).

The second method provides the advantage that a fixed amount of the electrical power produced by the at least one regenerative power source is always reserved for operating the electrically operated cooling circuit of the cooling device. As a result, the electrical power provided for the at least one further electricity consuming device is reduced, but at the same time the security for supplying sufficient electrical energy to the cooling device is increased. The method is based on predicting how much electrical power the at least one regenerative power source produces and whether this is sufficient to supply the at least one further electricity consuming device with sufficient electricity in addition to the electrically operated cooling circuit of the cooling device. The available power of the at least one regenerative power source is calculated on the basis of the performance characteristics of the at least one regenerative power source and the determined density of the available energy. The performance characteristics of the at least one regenerative power source are used in the context of the invention to calculate how much electrical power is actually provided by the at least one regenerative power source at the density of available energy.

If the amount of the available electrical power of the regenerative power source is greater than or equal to the sum of the maximum power consumption of the electrically operated cooling circuit of the cooling device and the maximum power consumption of the at least one further electricity consuming device the control system connects the at least one further electricity consuming device to the at least one regenerative power source. If, on the other hand, the available power of the regenerative power source is not sufficient, the at least one further electricity consuming device is disconnected from the at least one regenerative power source by the control system or is not connected to it at all.

Since the determination of the density of the available energy and the subsequent method steps are performed periodically, i.e. are regularly repeated, the control system of the power distributor ensures that even in the case of a variable density of the available energy, the electrically operated cooling circuit of the cooling device always has the maximum required electrical power available.

The third method according to the invention for operating a cooling device according to the invention comprises the following method steps:

a) input of the operating voltage/nominal voltage into the memory;
b) first voltage measurement of the supply voltage applied to the cooling device by the first sensor;
c) storing the value of the first voltage measurement in the memory of the control system;
d) comparing the operating voltage/nominal voltage to the value of the first voltage measurement in the control system: if the value of the first voltage measurement is less than the operating voltage/nominal voltage proceed to method step b), otherwise proceed to method step e);
e) connecting the at least one further electricity consuming device to the at least one regenerative power source;
f) second voltage measurement of the supply voltage applied to the cooling device by the first sensor after the at least one further electricity consuming device has been connected to the at least one regenerative power source;
g) comparing the operating voltage/nominal voltage to the value of the second voltage measurement in the control system: if the value of the second voltage measurement is greater than or equal to the operating voltage/nominal voltage proceed to method step f), otherwise proceed to processing step h);
h) disconnecting the at least one further electricity consuming device from the at least one regenerative power source, when the operating voltage/nominal voltage is greater than the value of the second voltage measurement;
i) periodic repetition of method steps b) to h).

The method is based on the realization that the electrical supply voltage with which the electrically operated cooling circuit of the cooling device is supplied decreases as soon as the at least one further electricity consuming device is switched on and the electrical power produced by the at least one regenerative power source is not sufficient to supply both the electrically operated cooling circuit and the at least one further electric consumer with sufficient electricity.

In this method according to the invention, a first voltage measurement first measures how high the supply voltage is before the at least one further electricity consuming device is switched on. If the measured value of the supply voltage from the first voltage measurement is less than the operating voltage/nominal voltage of the electrically operated cooling circuit of the cooling device, the electrical power produced by the at least one regenerative power source is not sufficient to also supply the at least one further electricity consuming device.

If the measured value of the first voltage measurement is equal to or greater than the operating voltage/nominal voltage, the at least one further electricity consuming device can be switched on. If in a subsequent second voltage measurement of the supply voltage it is found that the value of the second voltage measurement does not drop or decrease compared to the operating voltage/nominal voltage, the electrical power produced by the at least one regenerative power source is sufficient to supply both the electrically operated cooling circuit of the cooling device and the at least one further electricity consuming device. On the other hand, if the supply voltage drops or decreases, the at least one further electricity consuming device is disconnected from the at least one regenerative power source to ensure the preferential power supply for the electrically operated cooling circuit of the cooling device.

The above-described effect of the drop/decrease of the supply voltage also occurs when the power consumption of the cooling device increases. This may be the case, for example, when the electrically operated cooling circuit starts to cool down the at least one closable cooling space again, for example after placing new refrigerated goods therein, and at the same time the electrical power produced by the at least one regenerative power source is not sufficient to also provide a sufficient supply to the at least one further electricity consuming device.

Since the method steps b) to i) are repeated periodically, i.e. regularly, on the one hand a drop in the electrical supply voltage is detected as soon as on the one hand the power consumption of the electrically operated cooling circuit increases or the electrical power produced by the at least one regenerative power source decreases. Accordingly, on the one hand it is ensured that the electrically operated cooling circuit of the cooling device is reliably supplied with sufficient current and, on the other hand, a maximum of excess electrical power produced is made available for the at least one further electricity consuming device.

Figure 2:
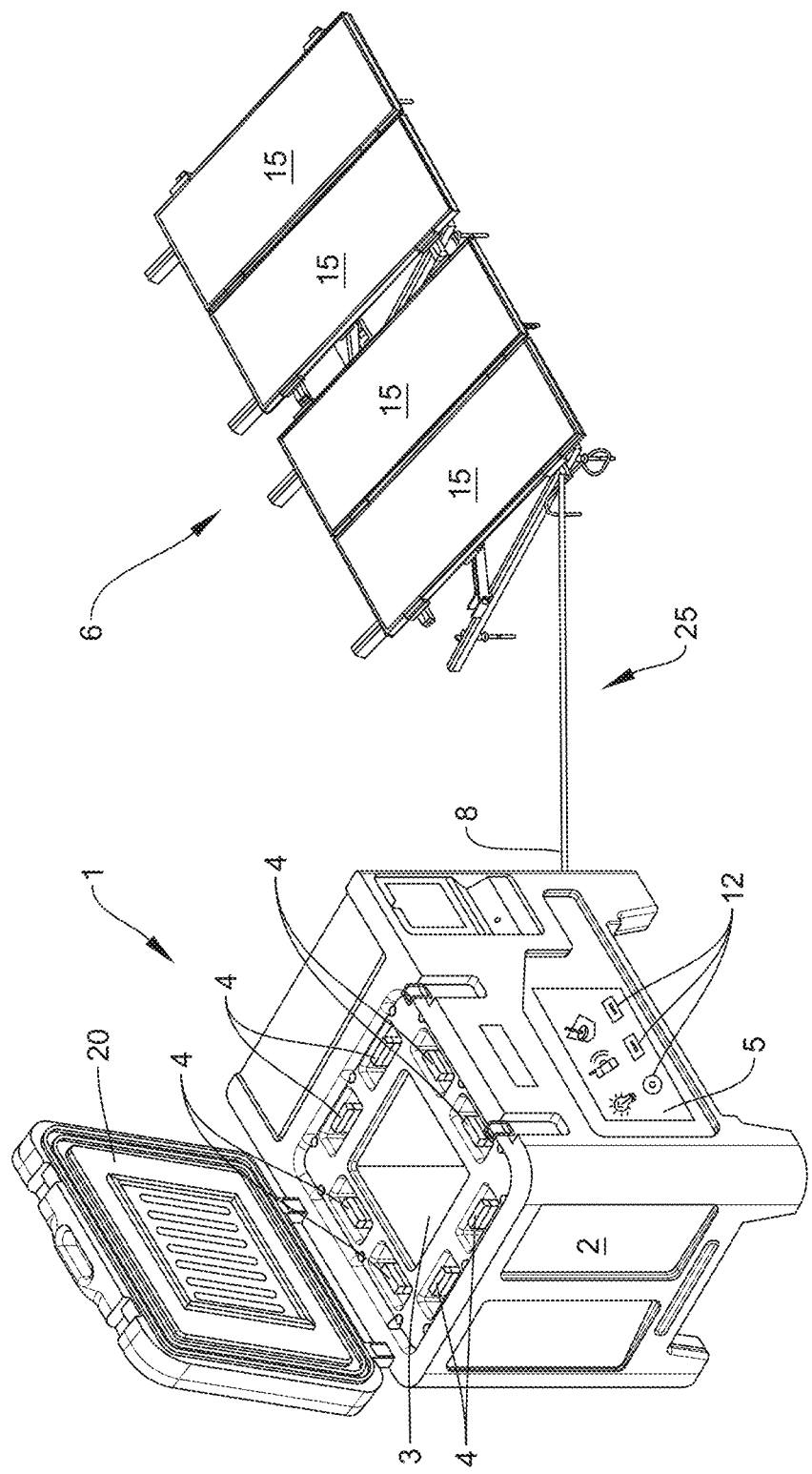
Figure 3:
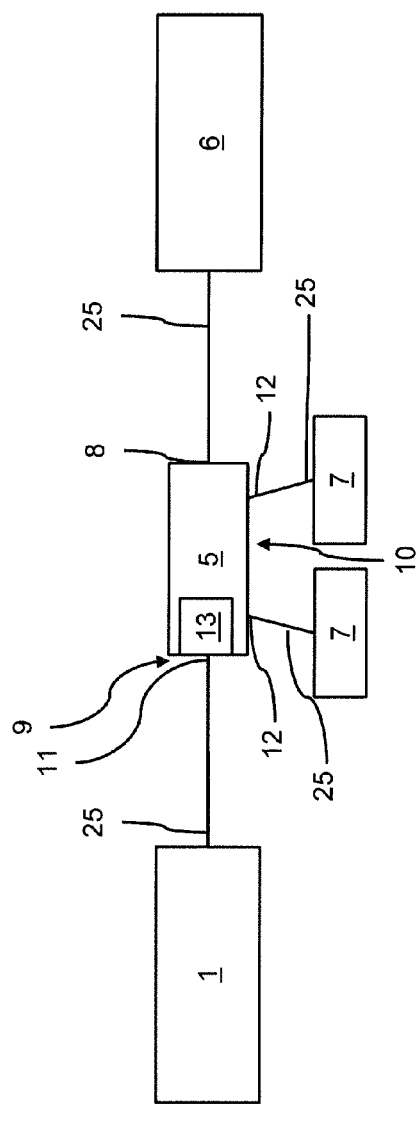
Figure 4:
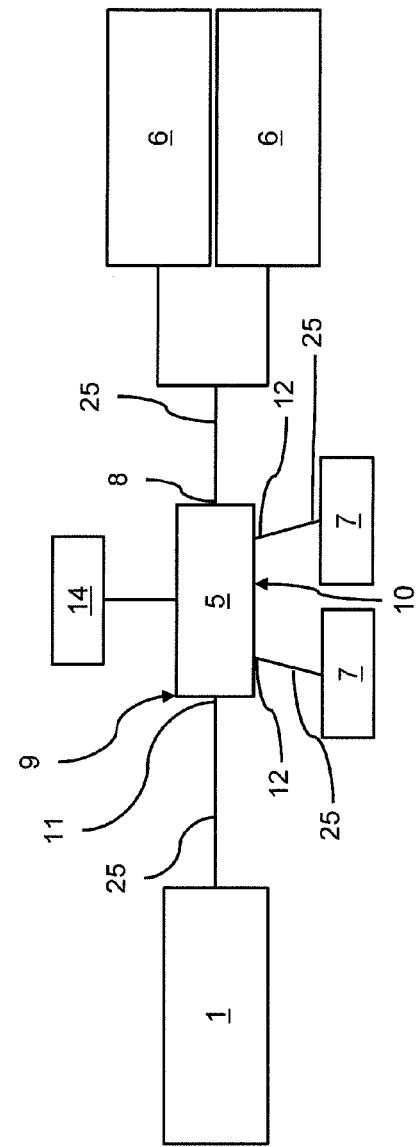
Figure 5:
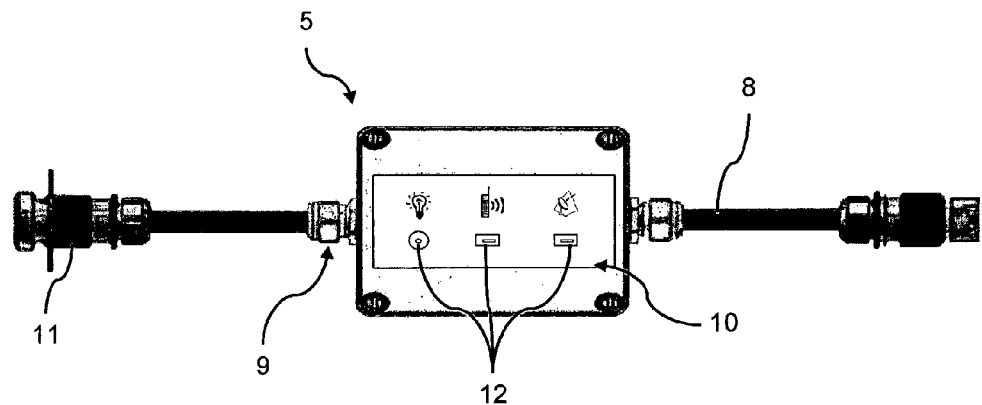
Figure 6:
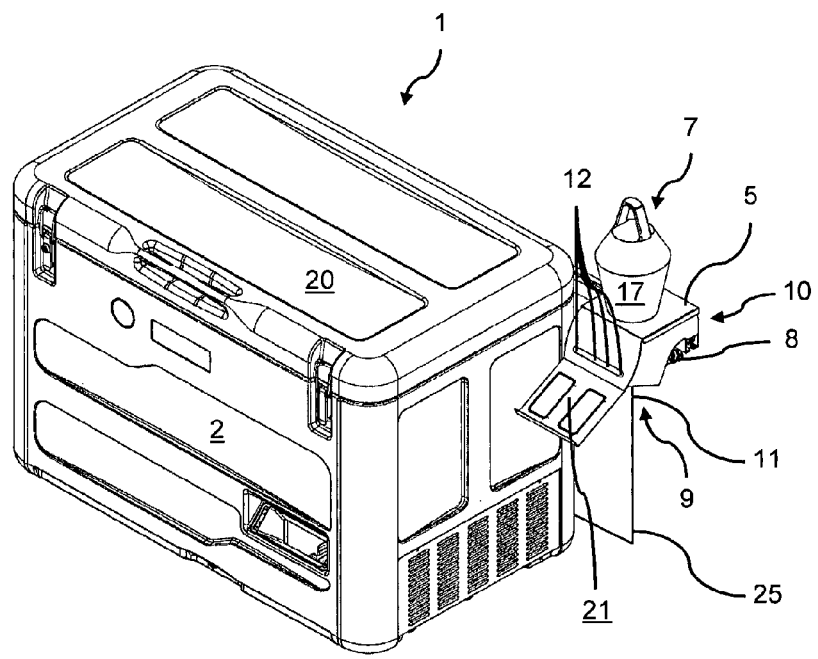
Figure 7:
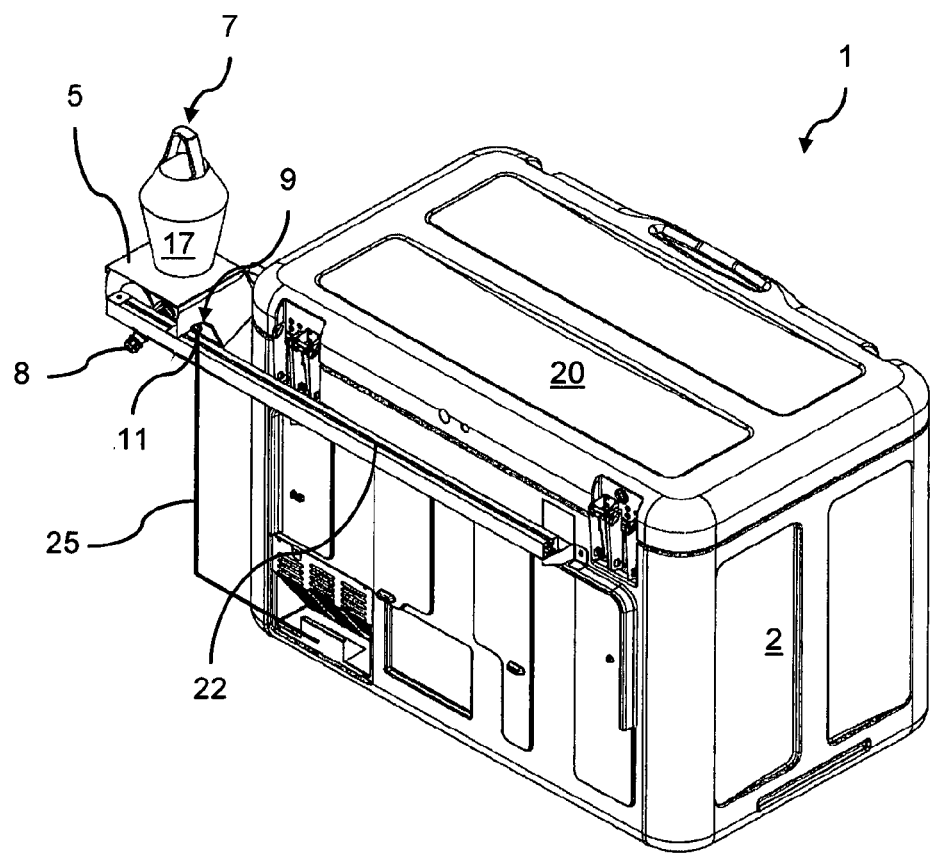
Figure 8:
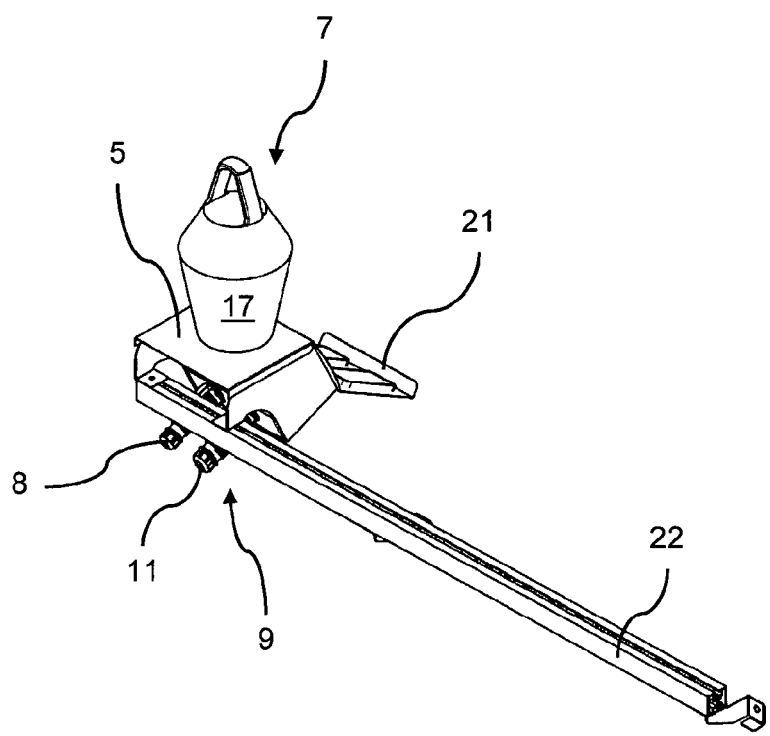
Figure 9:
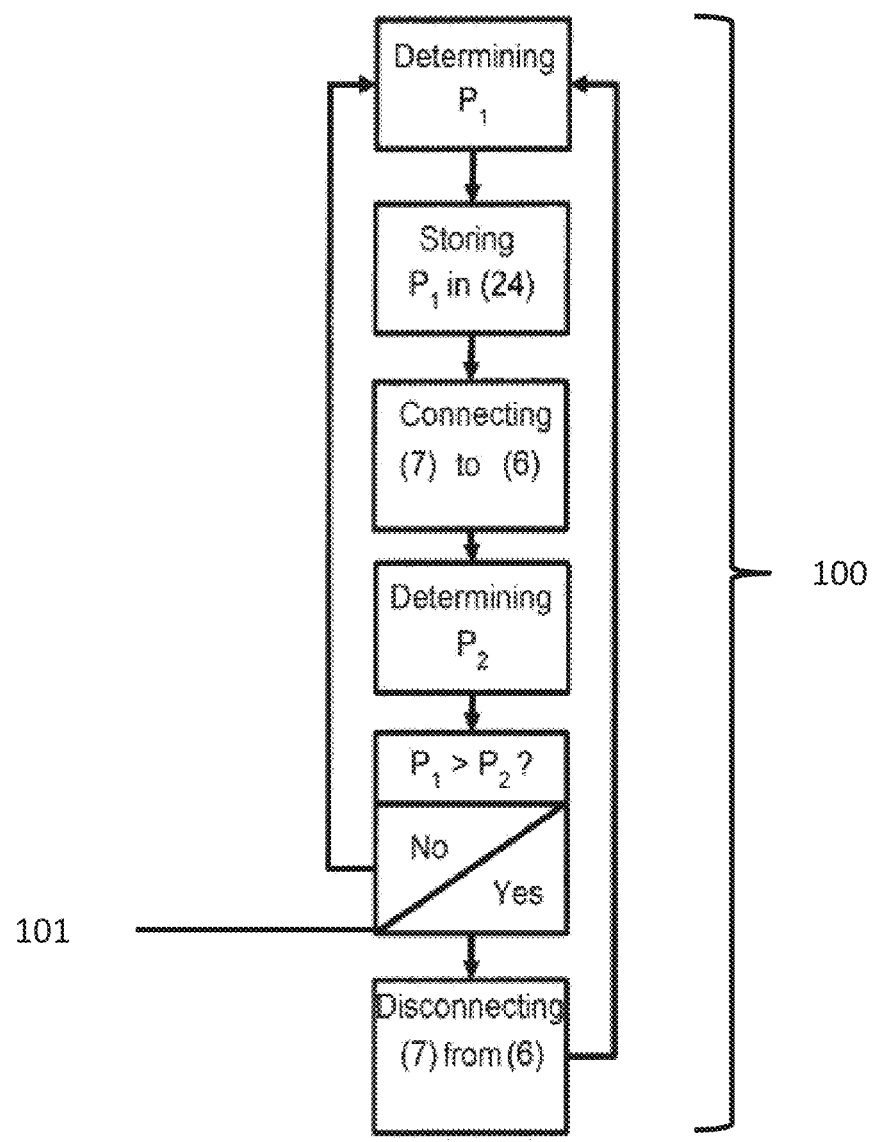
Figure 10:
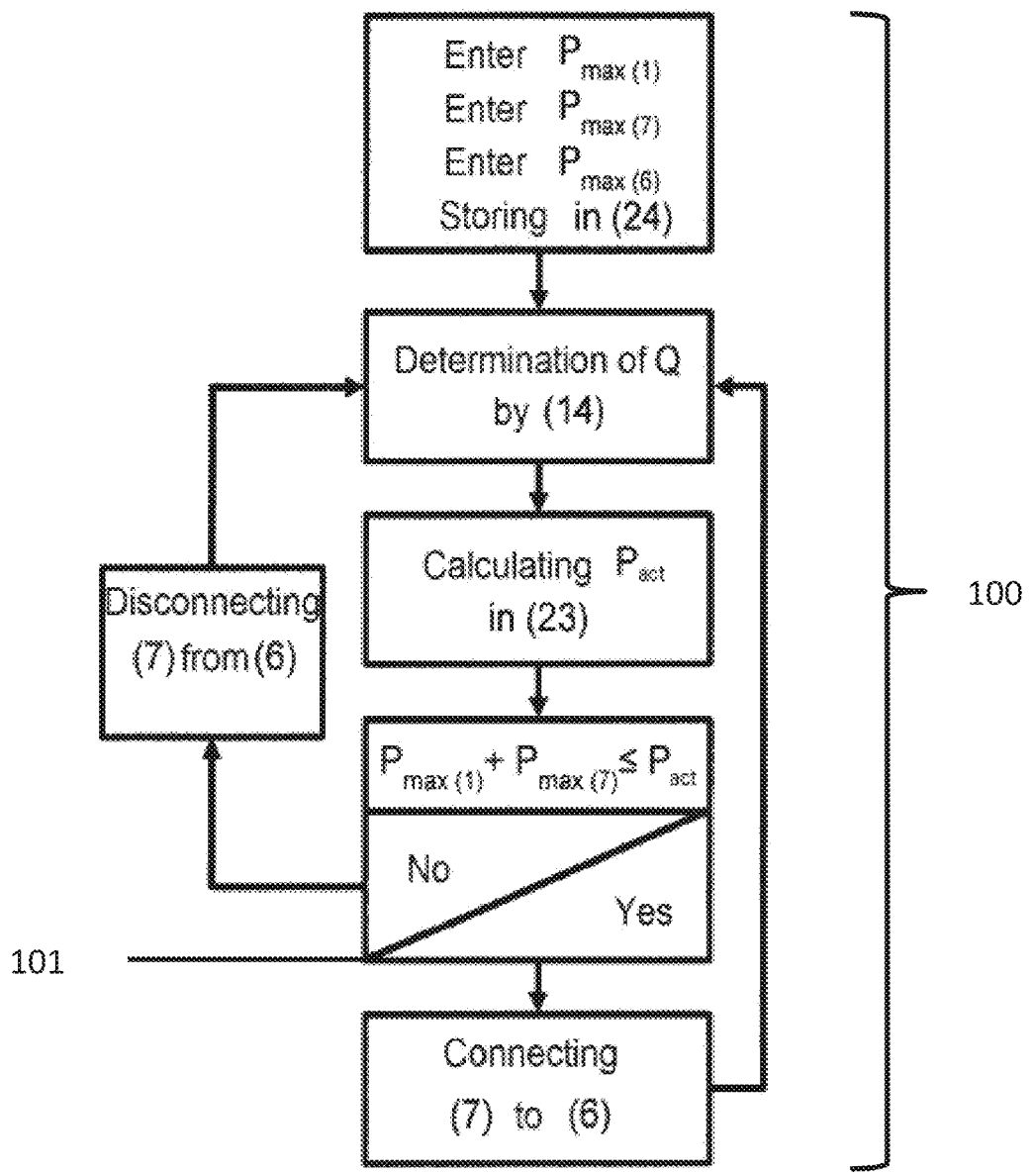

The invention is explained in more detail below with reference to three examples of the cooling device illustrated in the figures. These show:

FIG. 1 a first embodiment of a cooling device;
FIG. 2 second embodiment of a cooling device;
FIG. 3 a schematic arrangement of the components of a cooling device according to the first or second embodiment;
FIG. 4 a schematic arrangement of the components of a cooling device according to a third embodiment;
FIG. 5 a detailed view of the power distributor for a cooling device according to the first or second embodiment;
FIG. 6 a front perspective view of a cooling device according to the first embodiment;
FIG. 7 a rear perspective rear view of a cooling device according to the first embodiment;
FIG. 8 a rear perspective rear of the power distributor shown in FIG. 7;
FIG. 9 a flow chart with the method steps of the first method;
FIG. 10 a flow chart with the method steps of the second method; and
FIG. 11 a flow chart with the method steps of the third method.

The first embodiment of the cooling device 1 according to the invention shown in FIG. 1 is in the form of a freezer 2 and can be closed with a freezer lid 20. The cooling device 1 is connected to the power distributor 5 by wiring 25 between the first power output 9 and its cooling device connection 11. The power distributor 5 is in turn connected to a regenerative power source 6 by wiring 25 from its power input 8. The regenerative power source 6 here consists of four solar panels 15. In addition, the power distributor has a second power output 10 which has three electricity consuming device connections. A computer 18 and a telephone 19 are connected as electricity consuming devices 7 to two of the three electricity consuming device connections. In the first embodiment of the cooling device 1 the power distributor 5 is arranged separately from the cooling device 1 and is only connected to it via the wiring connection 25.

In the second embodiment of the cooling device 1 according to the invention shown in FIG. 2, the cooling device is in the form of a freezer 2 in the inside of which there is the closable cooling space 3. Eight cold storage packs 4 are arranged inside the freezer 2. The second embodiment of the cooling device 1 differs from the first embodiment in that the power distributor 5 is integrated in the cooling device 1. The wiring connection 25 runs from the at least one regenerative power source 6 directly via the power input 8 to the power distributor 5. The illustrated embodiment of the at least one regenerative power source 6 in FIG. 2 also comprises four solar panels 15. In the second embodiment of the cooling device 1 the cooling device connection 11 of the first power output 9 that supplies the electrically operated cooling circuit of the cooling device 1 with electric power is covered in the freezer 2 and thus, cannot be seen in the illustration of FIG. 2. In the second embodiment three electricity consuming device connections 12 of the power distributor 5 are arranged on the freezer 2 such that they are easily accessible, so that the at least one electricity consuming device 7 (not shown) can be connected to the power distributor 5.

In the schematic illustration shown in FIG. 3, the individual components of the cooling device 1 in the first and the second embodiment are arranged relative to each other and connected via wiring connections 25. For the schematic illustration of the arrangement it is not relevant whether the power distributor 5 is integrated in the cooling device 1 or is arranged outside of the cooling device 1. As already shown in FIG. 1 and FIG. 2 the regenerative power source 6 is connected to the power distributor 5 at the power input 8 via a wiring connection 25. In addition, the cooling device 1 is likewise connected with its electrically operated cooling circuit to the power distributor 5 via the cooling device connection 11 of the first power output 9 via a wiring 25. FIG. 3 also shows how two of the at least one further electricity consuming devices 7 are each connected to the power distributor 5 via a wiring 25 and the electricity consuming device connections 12 of the second power output 10. The schematically shown first sensor 13 arranged inside the power distributor 5 serves to determine the power consumption of the electrically operated cooling circuit of the cooling device 1.

The schematic illustration of a cooling device 1 of a third embodiment of the cooling device 1 shown in FIG. 4 differs from the first and second embodiment of the cooling device 1 in that the power distributor 5 has a second sensor 14 which measures the density of the available energy acting on the at least one regenerative power source. In the third exemplary embodiment shown, the power distributor 5 can also be integrated in the cooling device 1 or arranged outside the cooling device 1. However, the second sensor is arranged outside of the cooling device 1, close to the at least one regenerative power source 6. The embodiment shown in FIG. 6 also has two regenerative power sources 6 which are connected to the power distributor. The arrangement of the further components in FIG. 4 corresponds to the schematic arrangement shown in FIG. 3.

The power distributor 5 of the first embodiment of the cooling device 1 shown in FIG. 5 is arranged outside the cooling device 1. The power distributor 5 has a power input 8, a first power output 9 with a cooling device connection 11 and a second power output 10 having three electricity consuming device connections 12. The first sensor for determining the power consumption of the electrically operated cooling circuit of the cooling device 1 is installed inside the power distributor 5 (not visible).

The cooling device 1 according to the first embodiment of the invention shown in FIG. 6 has a power distributor 5 that is attached to a side of the cooling device 1. The cooling device 1 is in the form of a freezer 2. This is closed by a freezer lid 20. The connection between the cooling device 1 and the power distributor 5 corresponds to the embodiment shown in FIG. 3, but the at least one regenerative power source 6 is not shown. A lamp 17 is shown at the second power output 10 as the at least one further electricity consuming device 7. In addition, the power distributor 5 has a storage surface 21 and four further electricity consuming device connections 12 at the second power output 10.

In the cooling device 1 shown FIG. 7, the power distributor 5 is fastened to the rear of the freezer 2 with the aid of a rail 22. The rail 22 projects laterally beyond the freezer 2, so that the power distributor 5 can be arranged laterally on the cooling device 1. The power input 8 and the first power output 9 are arranged on the rear of the power distributor 5. The first power output 9 is connected to the cooling device connection 11 via a wiring 25 on the rear of the freezer 2.

The power input 8, the first power output 9 of the power distributor 5 and the cooling device connection 11 shown in FIG. 8 are provided as a plug connection.

FIG. 9 shows a flow chart of the sequence of the first method for operating a cooling device 1 using a control system 100 and priority logic 101. The first method is suitable for operating a cooling device 1 according to the first or second embodiment. First, a first determination $P_1$ of the power consumption of the electrically operated cooling circuit is made. The value of the first determination $P_1$ is stored in the memory 24 of the control system of the power distributor 5. The at least one further electricity consuming device 7 is then connected to the at least one regenerative power source 6. This is followed by a second determination $P_2$ of the power consumption of the electrically operated cooling circuit. A comparison between the measured value of the first determination $P_1$ and the measured value of the second determination $P_2$ is carried out in the computing unit 23 of the power distributor 5. If the measured value of the second determination $P_2$ is below the measured value of the first determination $P_1$, this means that the at least one regenerative power source 6 cannot provide sufficient electrical power to sufficiently supply both the electrically operated cooling circuit of the cooling device 1 and the at least one further electricity consuming device 7 with sufficient power. Accordingly, the control system disconnects the at least one further electricity consuming device 7 from the regenerative power source 6 to ensure the supply of the electrically operated cooling circuit. If, on the other hand, the measured value of the first determination $P_1$ is equal to the measured value of the second determination $P_2$, this means that the regenerative power source 6 provides sufficient electrical power to supply both the electrically operated cooling circuit of the cooling device 1 and the at least one further electricity consuming device 7 with power. Accordingly, the connection between the at least one regenerative power source 6 and the at least one further electricity consuming device 7 is not disconnected. After the comparison between the measured value of the first determination $P_1$ and the measured value of the second determination $P_2$ the method steps are repeated by a new determination of the measured value of the first determination $P_1$.

FIG. 10 shows a flow chart of the method steps of the second method for operating a cooling device 1 using a control system 100 and priority logic 101. The second method for operating a cooling device 1 is suitable for operating a cooling device 1 according to the third embodiment. In the procedure, the maximum power consumption $P_{max(1)}$ of the electrically operated cooling circuit of the cooling device 1 and the maximum power consumption $P_{max(7)}$ of the at least one further electricity consuming device are stored in the memory 24 of the control system of the power distributor 5. In addition, the performance characteristics $P_{max(6)}$ of the regenerative power source 6 are also entered and stored in the memory 24 of the control system. The density of the available energy Q is then determined by the second sensor 14. On the basis of the stored performance characteristics $P_{max(6)}$ of the at least one regenerative power source and the density of the available energy Q, the available power $P_{act}$ of the at least one regenerative power source 5 can be calculated in the computing unit 23 of the control system.

The available electrical power $P_{act}$ of the at least one regenerative power source 6 is then compared to the sum of the maximum power consumption $P_{max(1)}$ required for the operation of the electrically operated cooling circuit of the cooling device and the maximum power consumption $P_{max(7)}$ of the at least one further electricity consuming device 7. If the result of the comparison is that the available power $P_{act}$ of the at least one regenerative power source 6 is greater than or equal to the sum of the maximum power consumption $P_{max(1)}$ of the electrically operated cooling circuit and the maximum power consumption $P_{max(7)}$ of the at least one further electricity consuming device 7, the one further electricity consuming device 7 is connected to the at least one regenerative power source 6. Otherwise, if the available electrical power $P_{act}$ of the regenerative power source is too low, the at least one further electricity consuming device 7 is disconnected from the at least one regenerative power source 6 or not connected to it. After the method steps have been carried out, the density of the available energy Q is determined again and the method is carried out again.

Figure 11:
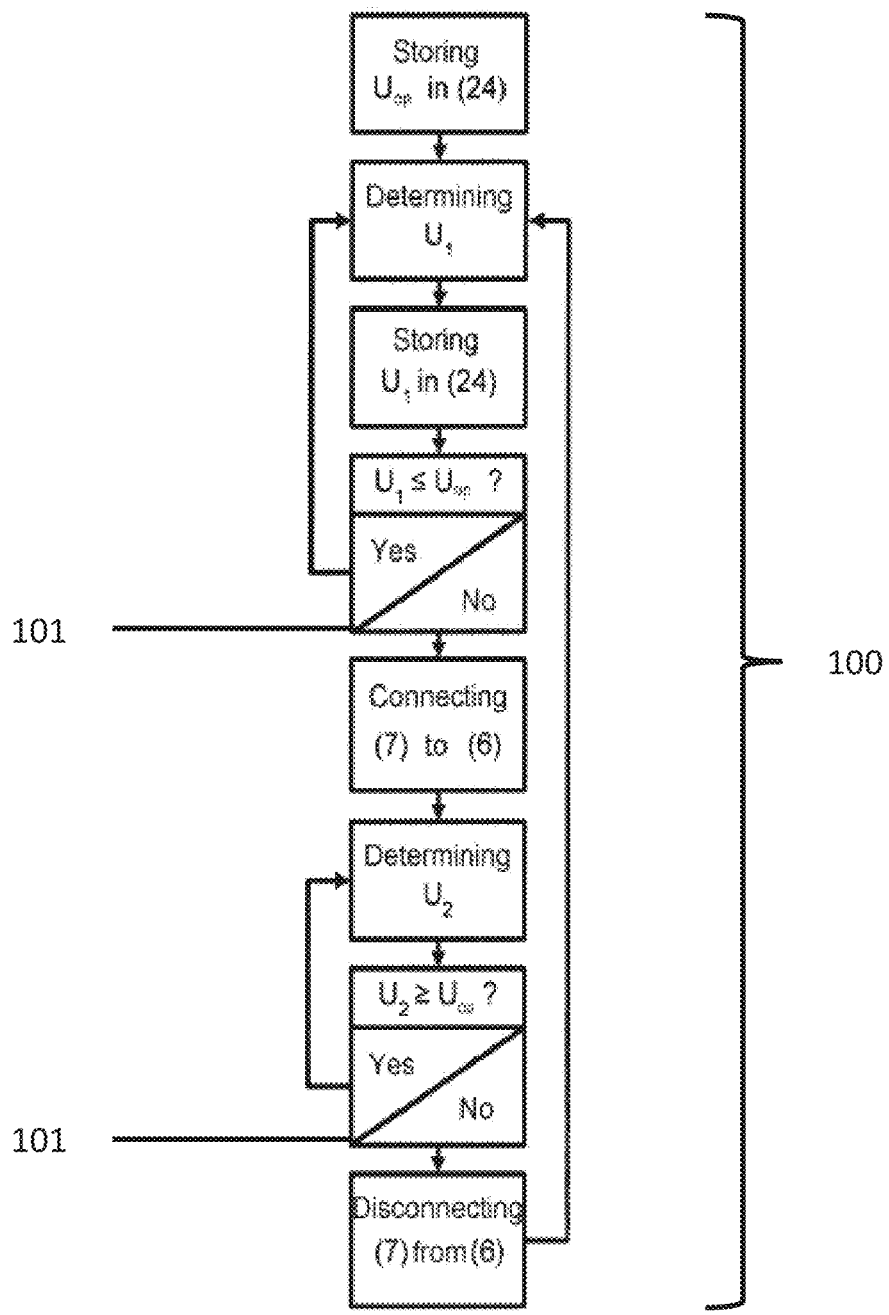

FIG. 11 shows a flow chart of the method steps of the third method for operating a cooling device 1 using a control system 100 and priority logic 101. The third method is suitable for operating a cooling device 1 according to the first or second embodiment. In the procedure, the operating voltage/nominal voltage $U_{op}$ of the electrically operated cooling circuit of the cooling device 1 is stored in the control system of the power distributor 5. This is followed by a first voltage measurement $U_1$ of the supply voltage. The value of the first voltage measurement $U_1$ is stored in the memory 24 of the control system of the power distributor 5.

Subsequently, as shown in FIG. 11, the measured value of the first voltage measurement $U_1$ is compared to the operating voltage/nominal voltage $U_{op}$ in the control system. If it turns out that the measured value of the first voltage measurement $U_1$ is less than the operating voltage/nominal voltage $U_{op}$, a first voltage measurement $U_1$ is again carried out. If, on the other hand, the measured value of the first voltage measurement $U_1$ is greater than or equal to the operating voltage/nominal voltage $U_{op}$, the at least one further electricity consuming device 7 is connected to the at least one regenerative power source 6. Then the supply voltage is measured in a second voltage measurement $U_2$ and compared in the control system to the operating voltage/nominal voltage $U_{op}$. If the result is that the measured value of the second voltage measurement $U_2$ is greater than or equal to the operating voltage/nominal voltage $U_{op}$, a second voltage measurement $U_2$ of the supply voltage is carried out again and a new comparison is made between the measured value of the second voltage measurement $U_2$ and the operating voltage/nominal voltage $U_{op}$. If the measured value of the second voltage measurement $U_2$ is less than the operating voltage/nominal voltage $U_{op}$, the at least one further electricity consuming device 7 is disconnected from the at least one regenerative power source 6. After the at least one further electricity consuming device 7 has been disconnected from the at least one regenerative power source 6, a new first voltage measurement $U_1$ of the supply voltage is carried out. Method steps b) to h) are regularly repeated.

LIST OF REFERENCE NUMBERS

1: cooling device
2: freezer
3: closable cooling space
4: cold storage pack
5: power distributor
6: regenerative power source
7: electricity consuming device
8: power input
9: first power output
10: second power output
11: cooling device connection
12: electricity consuming device connection
13: first sensor
14: second sensor
15: solar collector
16: wind-driven generator
17: lamp
18: computer
19: telephone
20: freezer lid
21: storage space
22: fastening device
23: computing unit
24 memory
25: wiring connection
$P_1$: first determination
$P_2$: second determination
$P_{max(1)}$: maximum power consumption of the electrically operated cooling circuit
$P_{max(7)}$: maximum power consumption of the at least one further electricity consuming device
$P_{max(6)}$: performance characteristics of the at least one regenerative power source
$P_{act}$: available power of the at least one regenerative power source
Q: density of the available energy
$U_{op}$: operating voltage/nominal voltage
$U_1$: first voltage measurement
$U_2$: second voltage measurement

The invention claimed is:

1. A vaccine cooling device comprising:
   at least one closable cooling space;
   an electrically operated cooling circuit configured to cool the at least one closable cooling space; and
   a power distributor;
   and the cooling device for providing battery-free buffering of peak loads;
   the power distributor comprising: at least one power input; a first power output;
   and at least one second power output;
   the at least one power input being configured for connecting the power distributor to at least one solar collector, said solar collector providing a regenerative power source;
   said first power output being a cooling device connection configured for connecting said power distributor to said electrically operated cooling circuit;
   said at least one second power output being an electricity consuming device connection configured for connecting said power distributor to at least one further electricity consuming device;
   said power distributor having a plurality of power output modes with selection between said power output modes being controlled by priority logic of a control system;
   one of said power output modes being a mode in which said power distributor provides power from said solar collector simultaneously to said cooling circuit and to said further electricity consuming device;
   another of said power output modes being a mode in which said power distributor provides power from said solar collector to said cooling circuit without providing power from said solar collector to said further electricity consuming device;
   said priority logic being configured such that, in the event of a lack of electrical power from said solar collector for providing power from said solar collector to said cooling circuit and to said further electricity consuming device, said priority logic preferentially supplies electrical power from said solar collector to said cooling circuit; and
   said priority logic being configured to disconnect said further electricity consuming device from said solar collector when the electrical power produced by said solar collector falls below the power consumption of said cooling device and said further electricity consuming device.

2. The vaccine cooling device of claim 1, wherein said regenerative power source consists of said solar collector.

3. The vaccine cooling device of claim 1, wherein said power distributor comprises at least one first sensor configured to determine a power consumption of said cooling circuit.

4. The vaccine cooling device of claim 3, said control system being configured to operate according to an operating procedure comprising:
   a) determining a first a power consumption ($P_1$) of said cooling circuit using a first sensor before said further electricity consuming device is connected to said at least one regenerative power source;
   b) storing said first power consumption ($P_1$) in a memory of said control system;
   c) connecting said further electricity consuming device to said regenerative power source;
   d) determining a second power consumption ($P_2$) of said cooling circuit using said first sensor after said further electricity consuming device has been connected to said regenerative power source;
   e) comparing said first power consumption ($P_1$) with said second power consumption ($P_2$);
   f) disconnecting said further electricity consuming device from said regenerative power source if said second power consumption ($P_2$) is less than said first power consumption ($P_1$); and
   g) periodically repeating a) to f).

5. The vaccine cooling device of claim 3, said control system being configured to operate according to an operating procedure comprising:
   a) inputting an operating voltage/nominal voltage ($U_{op}$) into a memory of the control system;
   b) measuring a first voltage ($U_1$) of a supply voltage applied to the cooling device using said first sensor;
   c) storing the value of said first voltage ($U_1$) in said memory of said control system;
   d) comparing said operating voltage/nominal voltage ($U_{op}$) to said value of said first voltage ($U_1$) using said control system and subsequently following a procedure selected from: i) continuing to b) if said first voltage value is less than said operating voltage/nominal voltage; and ii) otherwise continuing to
   e) connecting said further electricity consuming device to said regenerative power source;
   f) measuring a second voltage ($U_2$) of said supply voltage applied to said cooling device using said first sensor after said further electricity consuming device has been connected to said regenerative power source;
   g) comparing said operating voltage/nominal voltage ($U_{op}$) to said second voltage value ($U_2$) using said control system and subsequently following a procedure selected from: i) proceeding to f) if said second voltage ($U_2$) is greater than or equal to said operating voltage/nominal voltage ($U_{op}$); and ii) otherwise proceeding to h);
   h) disconnecting said further electricity consuming device from said regenerative power source if said operating voltage/nominal voltage ($U_{op}$) is greater than said second voltage value ($U_2$);
   i) periodically repeating b) to h).

6. The vaccine cooling device of claim 1, wherein said power distributor comprises at least one second sensor configured to determine a density of available energy.

7. The vaccine cooling device of claim 6, said control system being configured to operate according to an operating procedure comprising:
   a) inputting into a memory of said control system: a maximum power consumption ($P_{max(1)}$) of said cooling circuit; performance characteristics ($P_{max(6)}$) of said regenerative power source; and a maximum power consumption ($P_{max(7)}$) of said further electricity consuming device;
   b) determining a density of available energy (Q) using said second sensor;
   c) calculating the available power ($P_{act}$) of said regenerative power source on the basis of the performance characteristics ($P_{max(6)}$) of said regenerative power source and the density of the available energy (Q);
   d) connecting said further electricity consuming device to said regenerative power source if the available power ($P_{act}$) of said regenerative power source is determined to be greater than or equal to the sum of the maximum power consumption of said cooling circuit and the maximum power consumption of said further electricity consuming device;

e) disconnecting said further electricity consuming device from said regenerative power source if the available power ($P_{act}$) of said regenerative power source is determined to be less than the sum of the maximum power consumption of said electrically operated cooling circuit and the maximum power consumption of said further electricity consuming device; and f) periodically repeating b) to e).

8. The vaccine cooling device of claim 1, wherein said priority logic is configured to connect the at least one further electricity consuming device to said solar collector when the electrical power of solar collector exceeds the power consumption of said cooling circuit and said further electricity consuming device.

9. The vaccine cooling device of claim 1, wherein said power distributor (i) is configured to provide electrical power from said solar collector to a plurality of further electricity consuming devices and (ii) said priority logic being configured to disconnect or connect each of the plurality of further electricity consuming devices to said solar collector as a function of the power consumption of each respective further electricity consuming device.

10. The vaccine cooling device of claim 1, wherein said priority logic is configured so as to supply said further electricity consuming device with electricity from said solar collector when said electrically operated cooling circuit consumes no electrical power.

11. The vaccine cooling device of claim 1, wherein said electricity consuming device connection is provided as a charging device for a battery-operated electricity consuming device.

12. The vaccine cooling device of claim 11, wherein said battery-operated electricity consuming device is selected from a lamp, a computer, a telephone, a battery itself, and combinations thereof.

13. The vaccine cooling device of claim 1, wherein said cooling device is a freezer.

14. The vaccine cooling device of claim 1, wherein said cooling device comprises a cold storage pack and said cooling circuit is configured to cool the cold storage pack.

15. A vaccine cooling device comprising:
at least one closable cooling space;
an electrically operated cooling circuit configured to cool said closable cooling space;
a power distributor;
at least one solar collector, said solar collector providing a regenerative power source; and
at least one further electricity consuming device;
said cooling device for providing battery-free buffering of peak loads;
said power distributor comprising: at least one power input, a first power output and at least one second power output;
said power input being connected to said solar collector;
said first power output being a cooling device connection and being connected to said electrically operated cooling circuit;
said second power output being an electricity consuming device connection and being connected to said further electricity consuming device;
said power distributor having a plurality of power output modes with selection between said power output modes being controlled by priority logic of a control system;
one of said power output modes being a mode in which said power distributor provides power from said solar collector simultaneously to said cooling circuit and to said further electricity consuming device;
another of said power output modes being a mode in which said power distributor provides power from said solar collector to said cooling circuit without providing power from said solar collector to said further electricity consuming device;
said priority logic being configured such that, in the event of a lack of electrical power from said solar collector for providing power from said solar collector to said cooling circuit and to said further electricity consuming device, said priority logic preferentially supplies electrical power from said solar collector to said cooling circuit; and
said priority logic being configured to disconnect said further electricity consuming device from said solar collector when the electrical power produced by said solar collector falls below the power consumption of said cooling device and said further electricity consuming device.

16. The vaccine cooling device of claim 15, wherein
said regenerative power source consists of said solar collector;
said power distributor comprises at least one first sensor configured to determine a power consumption of said cooling circuit of the cooling device;
said priority logic is configured to connect said further electricity consuming device to said solar collector when said electrical power of said solar collector exceeds the power consumption of said cooling circuit and said further electricity consuming device;
said priority logic is further configured to supply said further electrical electricity consuming device with electricity from said solar collector when said cooling circuit consumes no electrical power.

17. The vaccine cooling device of claim 15, wherein said further electricity consuming device is a battery-operated electricity consuming device selected from a lamp, a computer, a telephone, a battery itself, and combinations thereof.

18. The vaccine cooling device of claim 15, wherein said cooling device comprises a cold storage pack and said cooling circuit is configured to cool said cold storage pack.

19. The vaccine cooling device of claim 15, wherein
said regenerative power source consists of said solar collector;
said control system comprises at least one second sensor configured to determine the density of available energy;
said priority logic is configured to connect said further electricity consuming device to said solar collector when the electrical power of said solar collector exceeds the power consumption of said cooling circuit and said further electricity consuming device;
said priority logic is further configured to supply said further electrical electricity consuming device with electricity from said solar collector when said cooling circuit consumes no electrical power.

* * * * *